(12) United States Patent
Berglund et al.

(10) Patent No.: US 9,948,199 B2
(45) Date of Patent: Apr. 17, 2018

(54) HVDC CONVERTER SYSTEM WITH TRANSFORMER FUNCTIONS OR ARRANGEMENTS INTEGRATED INTO A SINGLE TRANSFORMER UNIT

(71) Applicant: ABB Schweiz AG, Baden (CH)

(72) Inventors: Mats Berglund, Ludvika (SE); Bo Akesson, Smedjebacken (SE)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 14/466,690

(22) Filed: Aug. 22, 2014

(65) Prior Publication Data

US 2014/0362619 A1    Dec. 11, 2014

(30) Foreign Application Priority Data

Feb. 24, 2012  (EP) .................................... 12156790

(51) Int. Cl.
| | |
|---|---|
| H02M 5/45 | (2006.01) |
| H02M 5/44 | (2006.01) |
| H01F 30/12 | (2006.01) |
| H02M 5/458 | (2006.01) |
| H02M 7/00 | (2006.01) |
| H01F 38/00 | (2006.01) |

(52) U.S. Cl.
CPC .............. *H02M 5/44* (2013.01); *H01F 30/12* (2013.01); *H02M 5/4505* (2013.01); *H02M 5/4585* (2013.01); *H02M 7/003* (2013.01); *H01F 2038/006* (2013.01)

(58) Field of Classification Search
CPC ...... H02M 5/45; H02M 3/4505; H02M 5/451; H02M 5/452; H02M 5/453; H02M 5/456; H02M 5/458

See application file for complete search history.

(56) References Cited

U.S. PATENT DOCUMENTS

| | | | |
|---|---|---|---|
| 2,929,016 A | | 3/1960 | Kreuzer |
| 5,666,277 A | * | 9/1997 | Bjorklund ................ H02J 3/36 323/208 |
| 5,886,888 A | | 3/1999 | Akamatsu et al. |
| 2006/0187684 A1 | * | 8/2006 | Chandrasekaran ........................ H02M 3/33592 363/16 |

(Continued)

FOREIGN PATENT DOCUMENTS

| | | | | |
|---|---|---|---|---|
| CA | 2327344 A1 | * | 6/2001 | ........... H01H 83/144 |
| EP | 1873885 A1 | | 1/2008 | |

(Continued)

OTHER PUBLICATIONS

International Preliminary Report on Patentability Application No. PCT/EP2013/053486 Completed: May 21, 2014 16 pages.

(Continued)

*Primary Examiner* — Jeffrey Gblende
(74) *Attorney, Agent, or Firm* — Whitmyer IP Group LLC (57) ABSTRACT

An AC-AC converter system includes transformer arrangements and HVDC converter units on primary and secondary sides of the system, respectively. The system exhibits first and second three-phase AC networks, and the converter units are interconnected via a DC connection. By integrating at least part of two transformer arrangements in one transformer unit, a cost efficient transformer configuration can be achieved.

13 Claims, 7 Drawing Sheets

(56) References Cited

U.S. PATENT DOCUMENTS

| | | | | |
|---|---|---|---|---|
| 2009/0225570 A1* | 9/2009 | Pereira | | H02J 3/36 363/37 |
| 2011/0044010 A1 | 2/2011 | Ledezma et al. | | |
| 2012/0026767 A1* | 2/2012 | Inoue | | H02M 7/217 363/89 |
| 2012/0032762 A1* | 2/2012 | Lescale | | H01H 33/02 335/11 |
| 2012/0218065 A1* | 8/2012 | Gerovac | | H02B 1/50 336/65 |
| 2013/0113589 A1* | 5/2013 | Luckey | | H01F 27/06 336/68 |

FOREIGN PATENT DOCUMENTS

| | | |
|---|---|---|
| JP | H0937467 A | 2/1997 |
| WO | 2008036009 A1 | 3/2008 |
| WO | WO 2008036009 A1 * | 3/2008 ............... H02J 3/36 |

OTHER PUBLICATIONS

International Search Report and Written Opinion of the International Searching Authority Application No. PCT/EP2013/053486 Completed: Nov. 26, 2013; dated Dec. 6, 2013 7 pages.

Zeliang Shu, "Single-Phase Back-To-Back Converter for Active Power Balancing, Reactive Power Compensation, and Harmonic Filtering in Traction Power System"; IEEE Transactions o Power Electronics, vol. 26, No. 2, Feb. 2010; 10 pages.

Graham, et al.; "The Garabi 2000 MW Interconnection Back-To-Back HVDC to Connect Weak AC Systems"; ABB; Dec. 4, 2004; 8 pages.

Canadian Office Action Application No. 2,865,024 dated Jun. 1, 2016 4 pages.

* cited by examiner

HVDC CONVERTER SYSTEM WITH TRANSFORMER FUNCTIONS OR ARRANGEMENTS INTEGRATED INTO A SINGLE TRANSFORMER UNIT

FIELD OF THE INVENTION

The present invention relates generally to an AC-AC converter High Voltage Direct Current (HVDC) system and more particularly to an AC-AC converter system comprising transformer arrangements and converter units.

BACKGROUND OF THE INVENTION

The advantages of HVDC components have been commercially exploited since 1954 when the first HVDC transmission was commissioned, the so-called HVDC Classic. Mercury-arc valves were eventually replaced with high power thyristors and DC transmissions have reached several GW, over +1-800 kV, and distances around 1000 kilometers. In 1997, a new breed of HVDC converter stations and HVDC transmissions were introduced, the so-called HVDC Light.

HVDC converter bridges and lines or cables can be arranged into a number of configurations for effective utilization. In a Back-to-Back configuration two HVDC converters are connected more or less directly to each other on the DC side, with the purpose of e.g. interconnecting two asynchronous AC power networks, or to regulate the flow of power in an AC power network. Back-to-back DC links are used in for example Japan, Brazil and Argentina for interconnections between power system networks of different frequencies (50 and 60 Hz).

Figure 1A:
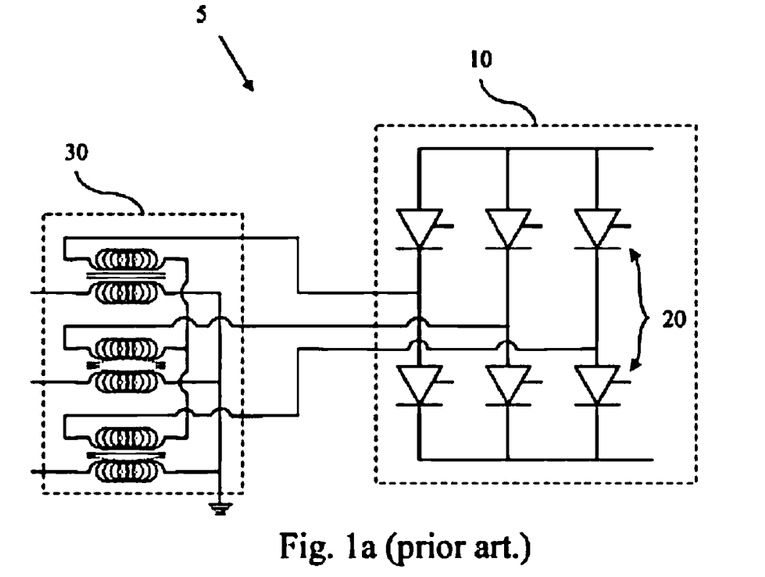
FIG. 1a schematically shows the electric circuit network for a conventional six-pulse valve group converter unit.
Figure 1B:
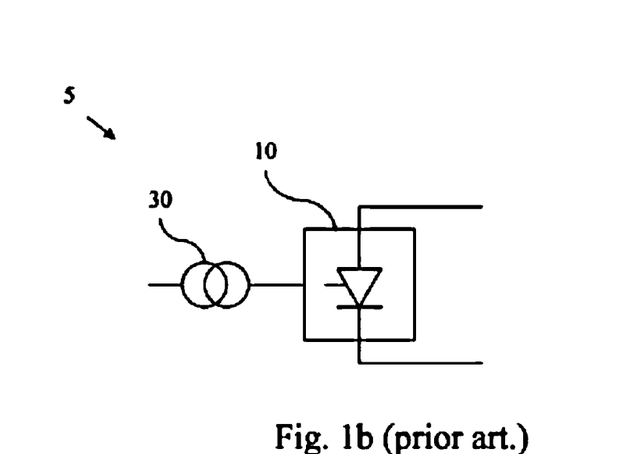

The integral part of an HVDC power converter is the valve or valve arm. It may be non-controllable if constructed from one or more power diodes in series or controllable if constructed from one or more thyristors in series. FIG. 1a schematically shows the electric circuit network for a conventional six-pulse converter unit 5. The standard bridge or converter valve group 10 in HVDC Classic is defined as a double-way connection comprising six valves 20 or valve arms which are connected to one or more physical transformer units 30 as illustrated in FIG. 1a. Electric power flowing between the HVDC valve group and the AC system is three phase. When electric power flows into the DC valve group from the AC system then it is considered a rectifier. If power flows from the DC valve group into the AC system, it is an inverter. Each valve consists of many series connected thyristors in thyristor modules. FIG. 1a represents the electric circuit network depiction for the six pulse valve group configuration. FIG. 1b is the graphical symbol of a 6 pulse converter unit.

Figure 2A:
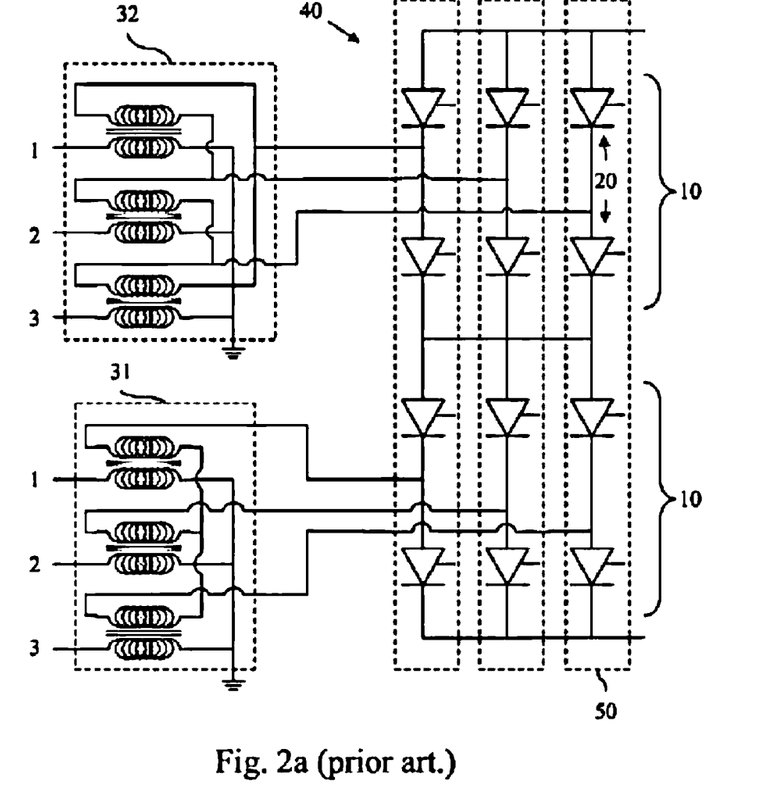
FIG. 2a schematically shows the electric circuit network for a conventional 12-pulse valve group converter unit.
Figure 2B:
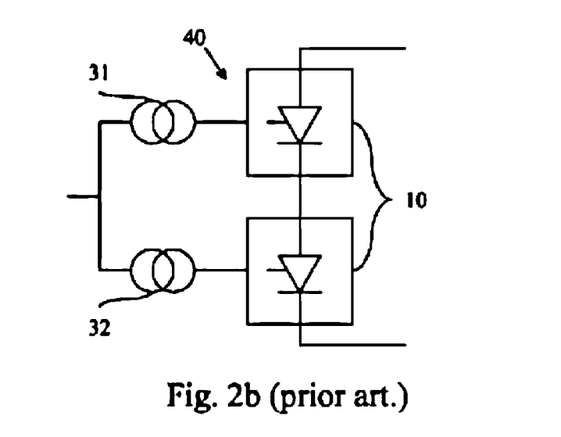

Today nearly all HVDC power converters with thyristor valves are assembled in a converter bridge of twelve pulse configuration. FIG. 2a demonstrates a twelve pulse converter with two three phase converter transformers 31, 32 with one DC side winding as an ungrounded star connection 31 and the other a delta configuration 32. Consequently the AC voltages applied to each six pulse valve group 10 which make up the twelve pulse valve group 40 have a phase difference of 30 degrees which is utilized to cancel the AC side 5th and 7th harmonic currents and DC side 6th harmonic voltage, thus resulting in a significant saving in harmonic filters. FIG. 2a also shows the outline 50 around each of the three groups of four valves in a single vertical stack. These are known as "quadrivalves" and are assembled as one valve structure by stacking four valves in series. Since the voltage rating of thyristors is several kV, a 500 kV quadrivalve may have hundreds of individual thyristors connected in series groups of valve or thyristor modules. FIG. 2b is the graphical symbol of a 12 pulse converter unit.

Figure 3:
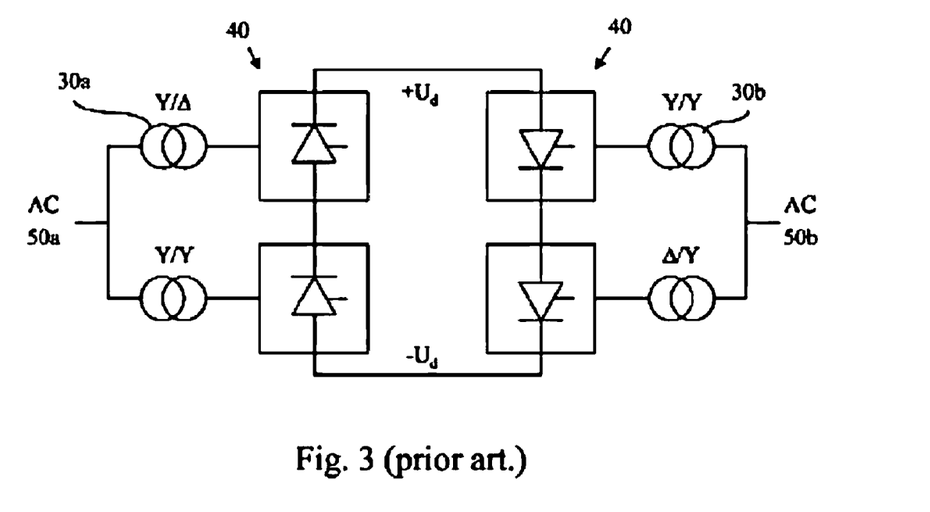
FIG. 3 is a scheme over a conventional back-to-back 12 pulse AC-AC converter system.

FIG. 3 is a scheme over a conventional back-to-back 12 pulse AC-AC converter, comprising an AC inlet 50a, an AC outlet 50b, two 12-pulse HVDC converter units 40 which are assumed to be arranged in a back-to-back configuration. The converter units are controlled by a control unit (not shown). Each converter unit comprises two six-pulse valve groups in series according to FIG. 2a. The inlet valve groups being connected to the AC inlet via separate inlet transformers 30a, and the outlet valve groups being connected to the AC outlet via separate outlet transformers 30b.

Figure 4A:
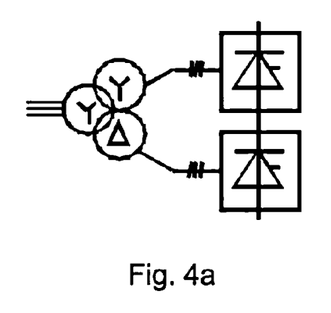
FIGS. 4a-4d show different HVDC transformer arrangement configurations.
Figure 4B:
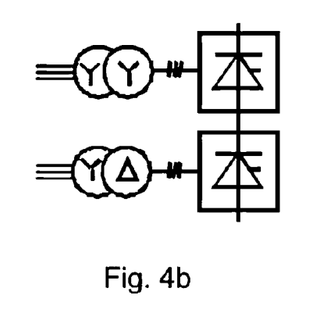
Figure 4C:
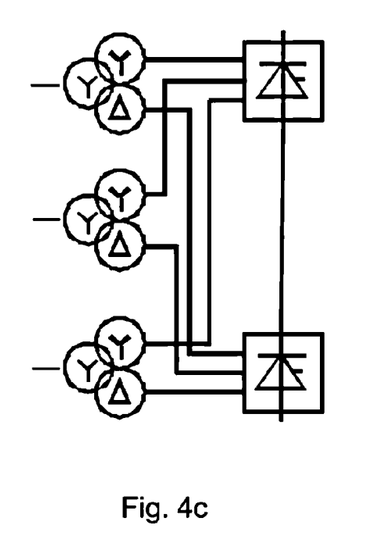
Figure 4D:
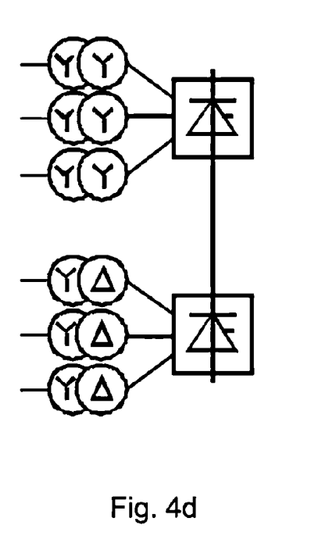

The converter transformers of a 12-pulse HVDC converter setup which together form a transformer arrangement can take different configurations, see FIGS. 4a-d. The configurations shown therein comprise one single 12-pulse group, which is used as a basic building block for HVDC converter systems. The 12-pulse group can be applied from neutral to pole (single-pole configurations), with two 12-pulse groups to poles of different voltage polarity (bipolar configurations) or with the neutral point in the middle of the converter with mid-point grounding, leading to a six-pulse group between neutral and pole. The transformers used in the different configurations are three-phase three-winding transformers (FIG. 4a), three-phase two-winding transformers (FIG. 4b), single-phase three-winding transformers (FIG. 4c), and single-phase two-winding transformers (FIG. 4d).

HVDC systems are expensive that there is a desire to be able to choose the most cost efficient HVDC transformer configuration for a given HVDC system topology, taking into consideration the need of spare HVDC transformers.

SUMMARY OF THE INVENTION

An object of the present invention is to provide a cost efficient HVDC transformer configuration for a transmission system with a DC voltage range above 25 kV.

The invention is based on the insight that the geographical closeness of transformers on the different sides in a back-to-back AC-AC converter system, such as transformers in an HVDC converter system, or other systems with a geographical closeness between different physical transformer units, creates the possibility of integrating different transformer functions into one single transformer unit.

According to the invention, there is provided an AC-AC converter system as defined in the independent claim. Thus, there is provided an AC-AC converter system comprising at least one first transformer arrangement with a primary side connectable to a first three-phase AC network and with a secondary side, at least one first HVDC converter unit connected to the secondary side of the first transformer arrangement, at least one second transformer arrangement with a primary side connectable to a second three-phase AC network and with a secondary side, at least one second HVDC converter unit connected to the secondary side of the second transformer arrangement, wherein the first and second HVDC converter units are interconnected by means of a DC connection, the system being characterized in that at least part of two transformer arrangements are integrated in one transformer unit.

In a preferred embodiment, the transformer unit comprises a two-phase transformer. The expression "two-phase transformer" should in this description be construed broadly and thus includes transformers with two phases from the same three-phase network as well as transformers with two phases from two different AC networks. By providing an AC-AC converter system with two-phase transformers, the total number of transformer units needed to perform the transformer function in an HVDC system is typically reduced, particularly when taking into consideration spare transformer units.

The converter units are preferably 12-pulse converter units and each of the transformer arrangements is connected to one of the 12-pulse converter units.

In one embodiment, the first and second HVDC converter units are interconnected back-to-back by means of the DC connection. This allows integration of transformer functions of the first and second AC networks.

In yet a preferred embodiment, the two-phase transformer is a two-phase three-winding transformer.

In one embodiment, part of two first transformer arrangements of the at least one first transformer arrangement are integrated in one transformer unit. This removes limitations in the equipment, such as maximum voltage and current of converter, transport limitations of transformers etc, in a monopolar or bipolar electrical energy transmission system.

Other preferred embodiments are defined by the dependent claims.

BRIEF DESCRIPTION OF THE DRAWINGS

The invention is now described, by way of example, with reference to the accompanying drawings, in which:

FIG. 1b shows the graphical symbol of a 6-pulse converter unit according to FIG. 1a.

FIG. 2b shows the graphical symbol of a 12-pulse converter unit according to FIG. 2a.

DETAILED DESCRIPTION OF THE INVENTION

In the following, a detailed description of different embodiments of an AC-AC converter system according to the invention will be given. In this context, the expression "transformer arrangement" should be interpreted as a group of transformers connectable to the same AC network. Also, the expression "transformer unit" should be interpreted as a physical unit or tank in which one or more transformers are provided. "AC" will be used as an abbreviation for "Alternating current" and "DC" as an abbreviation for "Direct current". Thus, the expression "DC connection" is an electrical connection between two locations wherein electrical energy is transferred by means of direct current.

Figure 5:
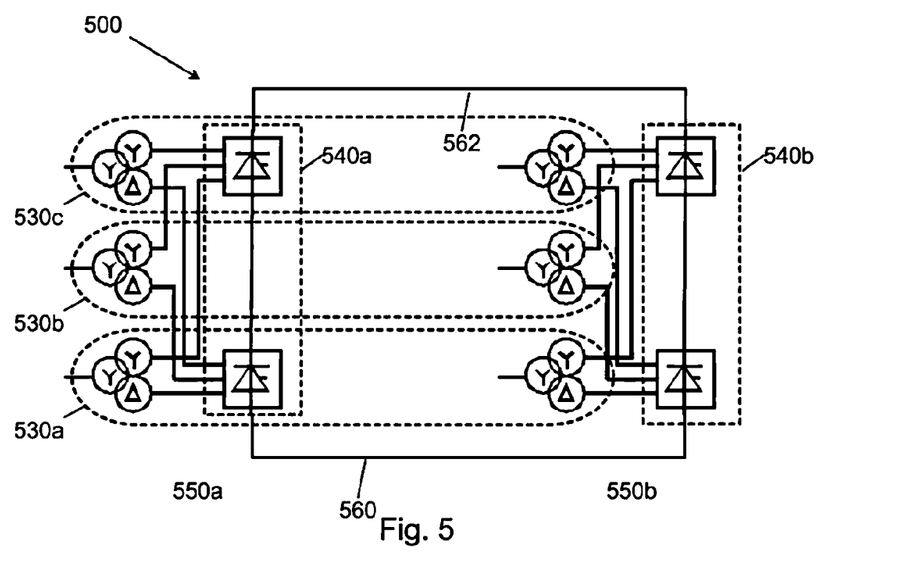
FIG. 5 is a scheme of an AC-AC converter system according to the invention.

FIG. 5 is a scheme over a back-to-back 12 pulse AC-AC converter system according to the invention, generally designated 500, using the general transformer configuration of FIG. 4c. The system comprises an AC inlet 550a, an AC outlet 550b, and two 12-pulse HVDC converter units 540a, 540b arranged in a back-to-back configuration. The converter units are controlled by a control unit (not shown). Each converter unit comprises two six-pulse valve groups in series according to FIG. 2a.

The inlet converter unit 540a is connected to the AC inlet 550a via inlet transformer functions provided by a first transformer arrangement and the outlet converter unit 540b is connected to the AC outlet via outlet transformer functions provided by a second transformer arrangement. These transformer functions or arrangements correspond to the single-phase, three-winding configuration shown in FIG. 4c. However, the geographical closeness of the transformer functions on each side of the back-to-back converter system 500 creates the possibility of integrating the transformer functions of the two different sides of the converter into one single transformer unit—a two-phase transformer (as the AC networks to which they are connected are separate from each other). An especially attractive configuration is two-phase three-winding transformers, as the number of transformer units needed to serve the transformer function is just three transformers. In FIG. 5, it is shown how the transformer functions are integrated into three two-phase three-winding transformers, designated 530a, 530b, and 530c.

Figure 5A:
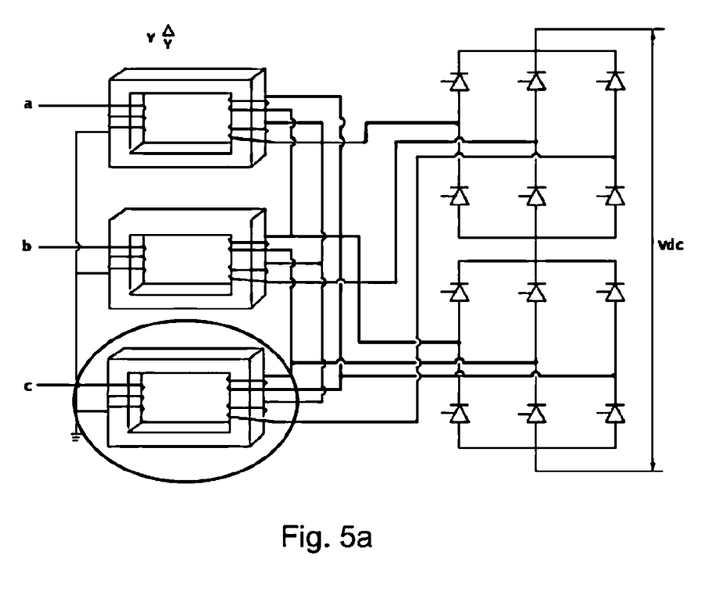
FIG. 5a is a detailed scheme of a transformer function comprised in the AC-AC converter system of FIG. 5.

In one embodiment, the two-phase transformers are realized as two individual active parts, i.e., core and windings, in the same tank. Thus, two separate transformer cores are provided within the same transformer casing. Referring to FIG. 5a, showing one single-phase, three-winding core enclosed by a circle, in one embodiment, two such single-phase, three-winding cores are co-located in one transformer tank.

In an alternative embodiment, all windings are provided on one single physical transformer core on a core form transformer. In this case, part of the core is used as a return path for the magnetic flux. One example of a solution with a two-phase transformer on the same transformer core would be two single phase core designs each with one wound limb and two unwound return limbs for magnetic flux, being transformed into one single core design with two wound limbs, two unwound core limbs for return flux and an unwound center limb for return flux. The core type could be envisaged to be similar to a three-phase core with unwound outer core limbs without having windings on the center core limb. A single core design reduces labor needed to produce the core and the core and windings combined.

Advantages of an AC-AC converter system according to the invention with three-phase, three-winding transformers as compared to a conventional system appear from the table below.

| | Transformer configuration | |
|---|---|---|
| | 3-phase 3-winding | 2-phase 3-winding |
| Number of active transformers | 2 | 3 |
| Number of spare transformers | 1-2 | 1 |
| Spare rated power as percentage of active power | 50-100% | 33% |
| Total number of windings | 27-36 | 24 |

Figure 6:
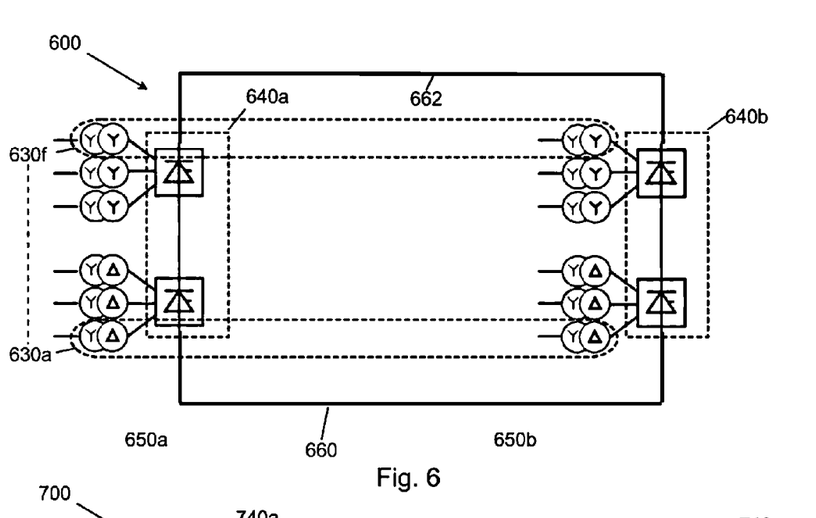
FIGS. 6-9 show different embodiments of the implementation of integration of different transformer functions into one transformer unit.

FIG. 6 is a scheme over an alternative back-to-back 12 pulse AC-AC converter system according to the invention, generally designated 600, using the transformer configuration of FIG. 4d. The system comprises an AC inlet 650a, an AC outlet 650b, and two 12-pulse HVDC converter units 640a, 640b arranged in a back-to-back configuration. The converter units are controlled by a control unit (not shown). Each converter unit comprises two six-pulse valve groups in series according to FIG. 2a.

The inlet converter unit 640a is connected to the AC inlet 650a via inlet transformer functions and the outlet converter unit 640b is connected to the AC outlet via outlet transformer functions. These transformer functions correspond to the single-phase, two-winding configuration shown in FIG. 4d. Also in this embodiment, the geographical closeness of the transformer functions creates the possibility of integrating transformer functions of the two different sides of the converter into one single transformer unit. In FIG. 6, it is shown how the transformer functions of one single-phase, two-winding function on the two sides are integrated into one two-phase, two-winding transformer 630a. The other transformer functions are correspondingly integrated into two-phase two-winding transformer units, resulting in six transformer units 630a-630f.

Figure 7:
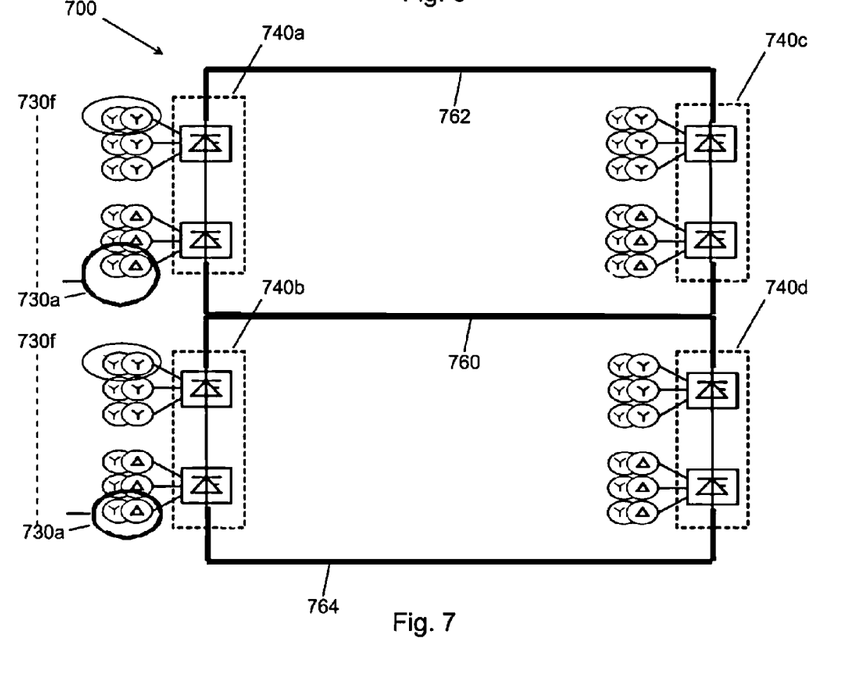

Reference is now made to FIG. 7, wherein a bipolar system, generally designated 700, is shown. The system comprises four 12-pulse converter units 740a-d, two provided on an AC inlet side 750a and two on an AC outlet side 750b. The two sides are interconnected by means of a neutral line 760, a positive line 762 and a negative line 764. This system is conventionally used for long distance transmission of electrical energy. This means that the transformer functions on the two sides: the AC inlet side and the AC outlet side, are not provided in geographical closeness to each other. However, the fact that the two converter units 740a, 740b on the AC inlet side 750a and correspondingly the two converter units 740c, 740d on the AC outlet side 750b are provided in geographical closeness to each other makes the inventive idea applicable also to this kind of system.

In this embodiment the same transformer function of the two poles in a bipole are integrated into the same transformer unit. Thus, one example is that the transformer functions encircled in FIG. 7 are integrated into same physical transformer unit 730a. The other transformer functions are integrated in the same way, resulting in a total of twelve transformer units: six on the AC inlet side 750a and six on the AC outlet side 750b. This removes limitations in the equipment, such as maximum voltage and current of converter, transport limitations of transformers etc.

Figure 8:
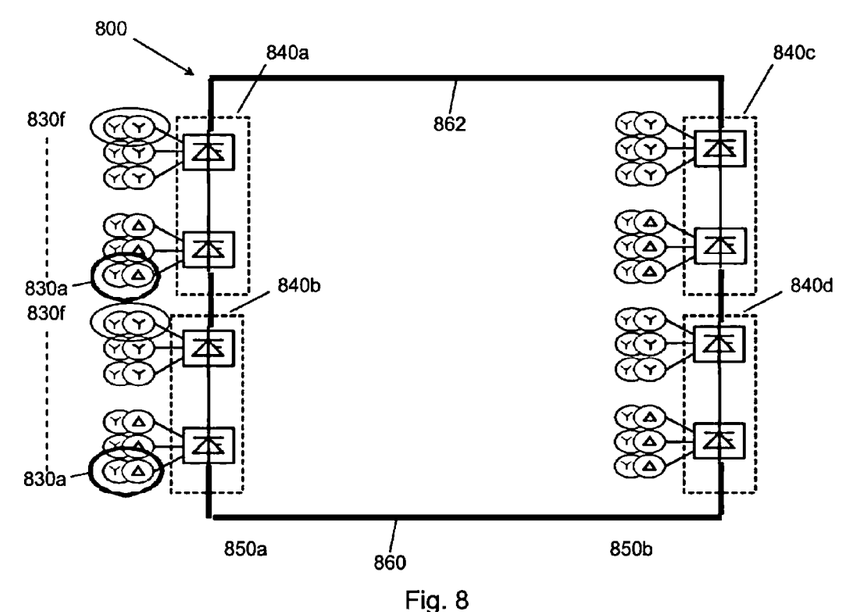

Reference is now made to FIG. 8, wherein a monopole system, generally designated 800, is shown. The system comprises four 12-pulse converter units 840a-d, two provided on an AC inlet side 850a and two on an AC outlet side 850b. The two sides are interconnected by means of a positive line 860 and a neutral line 862. This system is conventionally used for long distance transmission of electrical energy.

The inlet converter units 840a, 840b are connected to the AC inlet side 850a via separate inlet transformer functions and the outlet converter units 840c, 840d are connected to the AC outlet side 850b via separate outlet transformer functions. The transformer configurations correspond to those shown in FIG. 4d.

In this case, the transformer functions provided on one side, i.e., either the AC inlet side 850a or the AC outlet side 850b, are provided in the same geographical location and close to each other.

In this embodiment the transformer integrates the same transformer function of the two poles in a bipole into the same transformer unit. Thus, one example is that the transformer functions encircled in FIG. 8 are integrated into same physical unit 830a. The other transformer functions are integrated in the same way, resulting in a total of twelve transformer units: six on the AC inlet side 850a and six on the AC outlet side 750b. This could remove limitations in the equipment, such as maximum voltage and current of converter, transport limitations of transformers etc.

Figure 9:
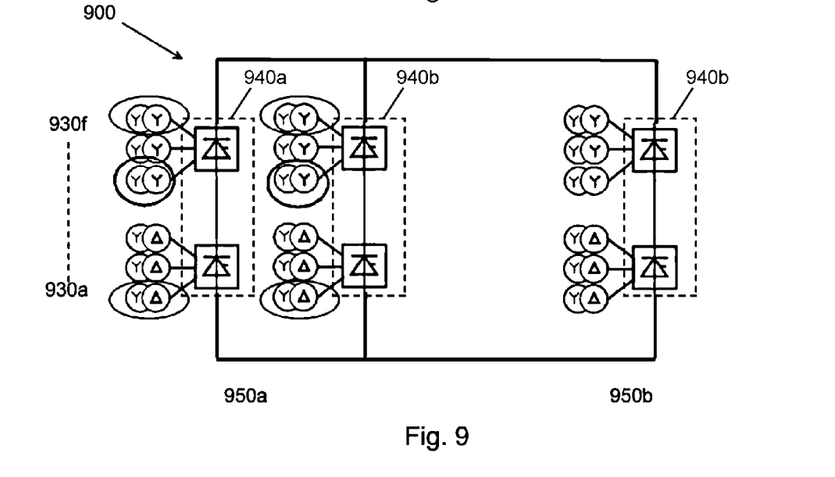

The inventive idea is also applicable to converter units connected in parallel. One such example is shown in FIG. 9, wherein a monopole system, generally designated 900, is shown. The system comprises three 12-pulse converter units 940a-c, two 940a, 940b provided in parallel on an AC inlet side 950a and one 940c on an AC outlet side 950b. The two sides are interconnected by means of a positive line 960 and a neutral line 962. This system is conventionally used for long distance transmission of electrical energy.

The inlet converter units 940a, 940b are connected to the AC inlet side 950a via separate inlet transformer functions and the outlet converter unit 940c is connected to the AC outlet side 950b via separate outlet transformer functions. The transformer configurations correspond to those shown in FIG. 4d.

In this case, the transformer functions provided on one the AC inlet side 950a are provided in the same geographical location and close to each other.

In this embodiment the transformer integrates the same transformer functions of the two parallel legs on the AC inlet side 950 into the same transformer unit. Thus, one example is that the transformer functions encircled in FIG. 9 are integrated into same physical unit 930a. The other transformer functions are integrated in the same way, resulting in a total of six transformer units on the AC inlet side. This could remove limitations in the equipment, such as maximum voltage and current of converter, transport limitations of transformers etc.

In the described embodiments of HVDC systems, LCC type converters used in HVDC Classic has been shown. It will be appreciated that the inventive idea is also applicable to HVDC Light, wherein VSC converters are used.

Although the exemplary embodiments have made reference to HVDC applications, it will be realized that the inventive idea is applicable to any AC-AC converter system with converters arranged back-to-back. In this context, the term "back-to-back" should be interpreted as any configuration wherein parts of converters from the two sides are in the same geographical location and close to each other.

What is claimed is:

1. An AC-AC HVDC converter system comprising:
an AC inlet, the AC inlet having at least one first transformer arrangement with a primary side connectable to a first AC network and with a secondary side,
at least one first converter unit connected to the secondary side of the first transformer arrangement,
an AC outlet, the AC outlet having at least one second transformer arrangement with a primary side connectable to a second different AC network and with a secondary side,
at least one second converter unit connected to the secondary side of the second transformer arrangement,
wherein the first and second converter units are interconnected by means of a DC connection,
wherein at least part of said first transformer arrangement of said AC inlet and at least a part of said second transformer arrangement of said AC outlet are integrated into one physical transformer casing so that transformer functions at the AC inlet and the AC outlet of the converter system are integrated, and
wherein two separate transformer cores, one from each of the first transformer arrangement at the AC inlet and the second transformer arrangement at the AC outlet, are provided within the one physical transformer casing.

2. The AC-AC HVDC converter system according to claim 1, wherein the first and second converter units are interconnected back-to-back by means of the DC connection.

3. The AC-AC HVDC converter system according to claim 2, wherein a first transformer function of the at least one first transformer arrangement and a second transformer function of the at least one second transformer arrangement are integrated in the one physical transformer casing.

4. The AC-AC HVDC converter system according to claim 1, wherein the one physical transformer casing comprises a two-phase transformer.

5. The AC-AC HVDC converter system according to claim 4, wherein the transformer is a two-phase three-winding transformer.

6. The AC-AC HVDC converter system according to claim 4, wherein the transformer is a two-phase two-winding transformer.

7. The AC-AC HVDC converter system according to claim 1, wherein two first transformer functions of the at least one first transformer arrangement are integrated in the one physical transformer casing.

8. The AC-AC HVDC converter system according to claim 1, wherein the first converter unit is a 12-pulse converter unit having valves each of which are connected to the first transformer arrangement, and wherein the second converter unit is another 12-pulse converter unit having valves each of which are connected to the second transformer arrangement.

9. The AC-AC HVDC converter system according to claim 1, wherein the at least one first transformer arrangement and the at least one second transformer arrangement each comprises single-phase, three-winding transformers.

10. The AC-AC HVDC converter system according to claim 1, wherein the at least one first transformer arrangement and the at least one second transformer arrangement each comprises single-phase, two-winding transformers.

11. The AC-AC HVDC converter system according to claim 2, wherein a third transformer function of the at least one first transformer arrangement and a fourth transformer function of the at least one second transformer arrangement are integrated in the one physical transformer casing.

12. The AC-AC HVDC converter system according to claim 1, wherein the at least part of said first and second transformer arrangements, without the first converter unit and the second converter unit, are integrated into the one physical transformer casing.

13. An AC-AC HVDC converter system comprising:
an AC inlet, the AC inlet having at least one first transformer arrangement with a primary side connectable to a first AC network and with a secondary side,
at least one first converter unit connected to the secondary side of the first transformer arrangement,
an AC outlet, the AC outlet having at least one second transformer arrangement with a primary side connectable to a second different AC network and with a secondary side,
at least one second converter unit connected to the secondary side of the second transformer arrangement,
wherein the first and second converter units are interconnected by means of a DC connection,
wherein a first part of said first transformer arrangement of said AC inlet and a first part of said second transformer arrangement of said AC outlet are integrated into a first physical transformer casing, and wherein a second part of said first transformer arrangement of said AC inlet and a second part of said second transformer arrangement of said AC outlet are integrated into a second physical transformer casing, so that transformer functions at the AC inlet are integrated with transformer functions at the AC outlet within the first and second physical transformer casings.

* * * * *